March 24, 1925.
T. SHIPLEY
BRINE TANK AND COOLER
Filed Feb. 8, 1924
1,530,579
2 Sheets-Sheet 1
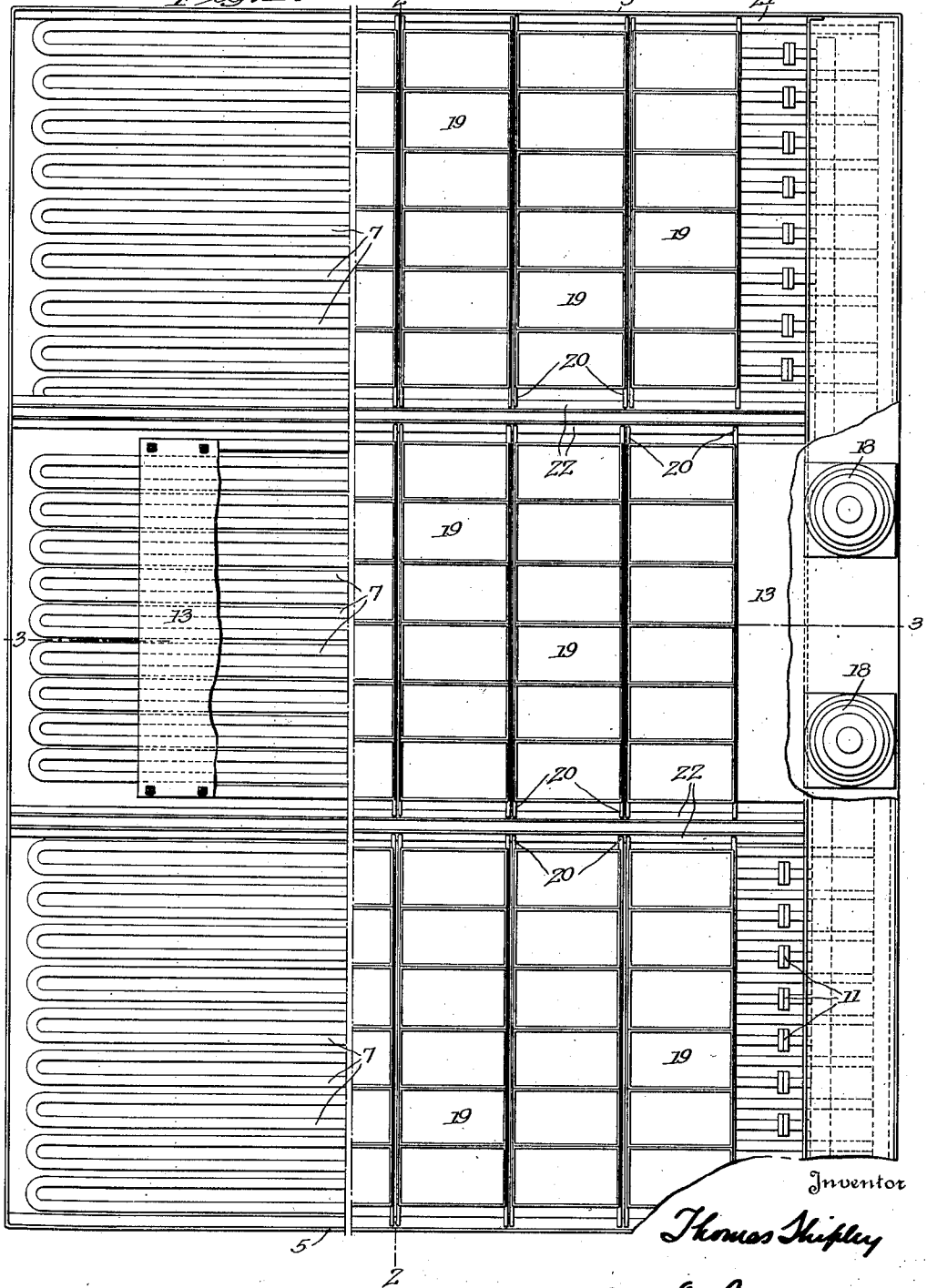

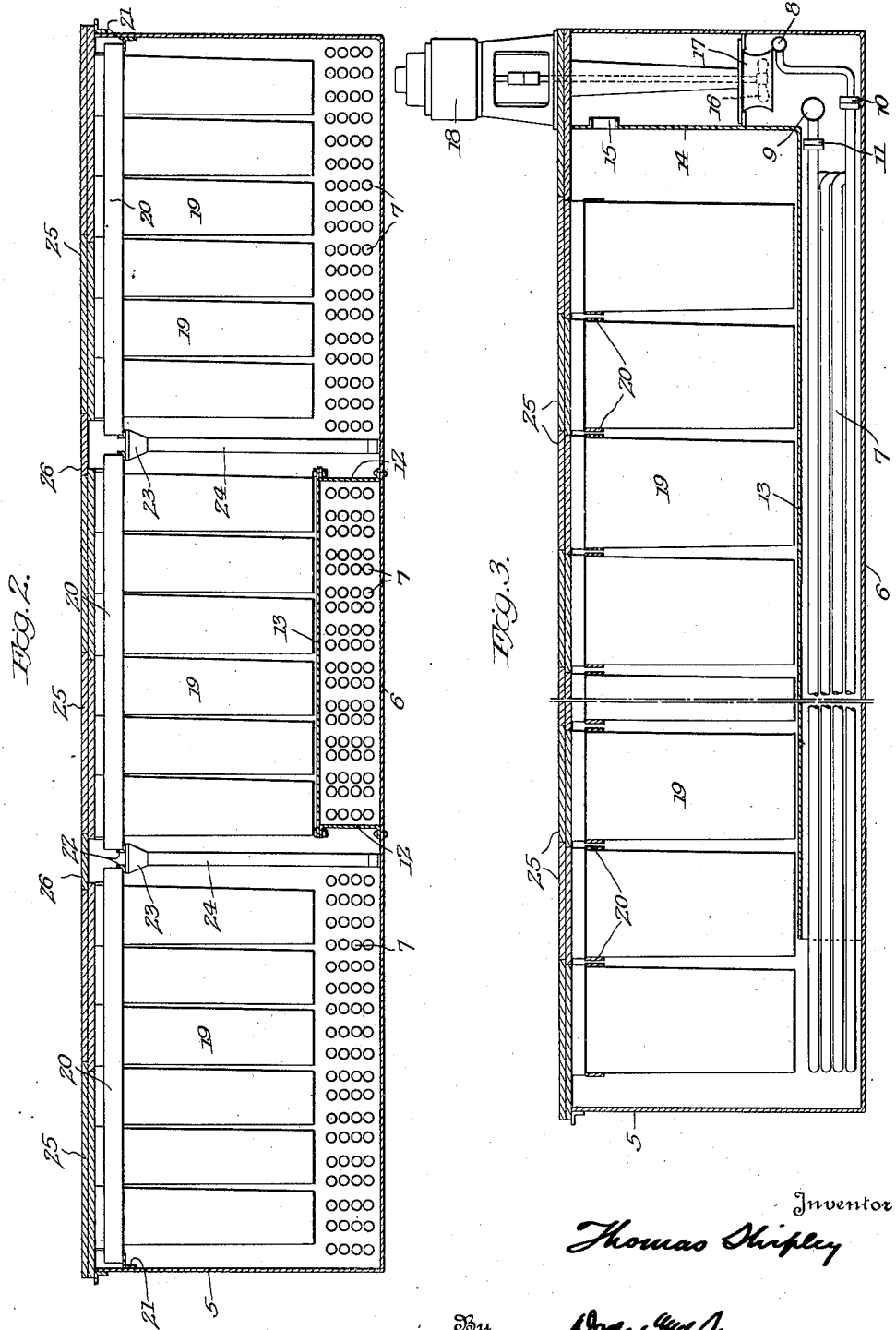

Patented Mar. 24, 1925.

1,530,579

UNITED STATES PATENT OFFICE.

THOMAS SHIPLEY, OF YORK, PENNSYLVANIA.

BRINE TANK AND COOLER.

Application filed February 8, 1924. Serial No. 691,428.

*To all whom it may concern:*

Be it known that I, THOMAS SHIPLEY, a citizen of the United States, residing at York, in the county of York and State of Pennsylvania, have invented certain new and useful Improvements in Brine Tanks and Coolers, of which the following is a specification.

This invention relates to refrigeration and particularly to brine tanks for use in can ice systems. The invention resides chiefly in the arrangement of the heat abstracting coils in the tank, and in the manner of supporting the cans in the tank so as to get the maximum capacity in a tank of given area.

In addition to reducing the ground area occupied by the tank to a minimum, the invention offers a number of advantageous features. It facilitates the use of multiple can units; simplifies the piping for the heat abstracting expansion coils; improves the circulation of the brine in the tank; raises the efficiency of the heat abstracting coils; permits the use of all-steel construction both for the tank and for the can supporting framework and so simplifies the cover or deck structure as to give easy access to the coils.

Heretofore it has been a common practice to locate the expansion coils in vertical tiers between can rows. This consumes valuable space and is subject to numerous other objections involving the structure of the can supporting framework.

It has also been proposed to mount the heat abstracting expansion coils in the bottom of the brine tank. In some cases all the coils were exposed to the brine in the body of the tank. This gives poor heat abstraction because of unfavorable circulation. In other cases all the coils were housed beneath a false bottom, i. e., in a duct. This makes the coils inaccessible and causes the brine to be much colder at one end of the tank than at the other.

The present invention is characterized by the location of the expansion coils in the bottom of the tank but I subdivide the expansion coils into two sets, in one of which the expansion coils are more closely spaced than in the other. This closely spaced set I enclose in a duct through which I circulate brine drawn from the top of the tank. Because of the forced circulation and the relatively large coil area, this unit operates at high duty, and although only about a quarter or a third of the coil surface in the tank, it can be caused to carry approximately half of the cooling load. The remaining, or unenclosed coils operate to chill the brine flowing past the cans so that brine temperatures in all parts of the tank are largely equalized.

The enclosing of the coils in a duct involves certain maintenance difficulties in connection with inspection and repair so that it is undesirable to enclose more coils than are necessary to secure the desired effect. I find that it is possible to house in the bottom of a brine tank sufficient expansion coils of standard form to secure the desired refrigerative effect, provided a portion of these coils, say a fourth to a third, is subjected to the forced circulation as described. This forced circulation can be made violent enough by the use of the duct to give reasonable circulation through the unenclosed coils.

In the drawing:

Fig. 1 is a plan view of the complete tank, parts being broken away to disclose the construction and reduce the length of the figure;

Fig. 2 is a section on the line 2—2 of Fig. 1; and

Fig. 3 is a section on the line 3—3 of Fig. 1.

The walls of the tank are shown at 5, and the bottom at 6. The coils, which are the ordinary trombone type, are shown at 7, and extend side by side throughout the length of the tank. They are fed from a supply header 8, and the expanded gas is drawn off through the discharge header 9. These are so placed near the end of the tank as to give easy access to the connections 10 and 11, by means of which the coils are connected to and disconnected from the headers.

It will be observed that in the particular example chosen for illustration, the coils are arranged in three groups, a middle group in which the coils 7 are quite closely spaced, and two side groups, one on either side of the middle group, in which the coils 7 are less closely spaced. The closely spaced middle group is surrounded by a duct made up of channel members 12, and top plates 13 removably bolted in place. As clearly shown in Figs. 1 and 3, this duct terminates some distance from one end of the tank (the left end as viewed in the figures). This is the discharge end of the duct, and the end of the duct is so spaced from the end of the tank that brine discharging from the duct will strike the end of the tank and then flow laterally before joining the return current.

At the opposite end of the tank (the right end in the figures), the duct is extended upward to the top of the tank by means of a plate 14, which is provided near the upper brine level in the tank, with inlet ports 15, so that brine enters the duct at this end of the tank near the upper surface.

Forced circulation is maintained by the usual brine circulators, which consist of propellers 16, mounted in guide ducts 17 and driven by electric motors 18 above the deck of the tank. The propellers 16 operate to draw brine in through the ports 15 and force it longitudinally through the duct so that it discharges at considerable velocity at the opposite end of the duct. The discharging current striking the end of the tank spreads out upward and laterally, returning to the opposite end of the tank partly through the spaces between the cans and partly through the remaining expansion coils 7.

The construction so far described offers a very compact arrangement of the heat abstracting coils, but to avail of all the possible advantages of the invention, it is necessary to provide an equally compact arrangement for the cans. This I do by making use of multiple can units, each consisting of six cans mounted closely together in a supporting frame. The exact number of cans per unit is immaterial.

The cans are shown at 19, and the side bars of the frame at 20. These side bars are connected together in any suitable manner, not shown in detail, and the cans are set closely together and permanently fixed in the frame. I describe and claim a can unit of this type in my co-pending application, Ser. No. 673,135 filed November 6, 1923, and consequently no claims to this unit are made in the present application.

The side frames 20 project beyond the cans and serve as means for supporting the entire unit. They rest on angle-iron brackets 21, fixed on the sides of the tank and on the positioning angles 22, which are supported on steel beams 23. The beams 23 are carried on a series of columns 24, arranged in rows.

Each row of columns 24 rests on the bottom of the tank, the rows of columns passing in the intervals between coil groups, as clearly shown in Fig. 2. The construction is such that the reinforcing mouths of the cans are virtually in contact with each other in rows transversely and longitudinally of the tank, an arrangement which results in the utmost conservation of space. The only departure from this close spacing is where the ends of the side frames 20 rest on the beams 23. At each of these stringers there is a substantial interval between the can units. The space lost in this manner is small.

Various suitable types of decks and hatches might be used, but I prefer the one shown in Figs. 2 and 3 consisting of separate covers 25, one for each can unit. Each cover rests upon its corresponding can unit and is supported thereby so no special deck framing is required other than a filler piece 26 overlying beam 23. From this construction it follows that any cover may be removed from its can unit and the unit withdrawn. When all the covers and can units making up rows lengthwise of the tank are removed, the corresponding portion of the tank and coils is fully exposed without any overlying frame work. This is a feature of great practical importance. In this connection attention is called to the fact that the intervals defined by the beams 23 correspond to the tube groups, and that the entire arrangement is favorable to the ready removal of the cover forming the duct in the central portion of the tank. In fact, the can supporting structure and the deck supporting structure are important factors in giving accessibility to the duct and to the coils, and in a large measure affects the commercial practicability of using coils enclosed in ducts.

What is claimed is:

1. In a refrigerating system, the combination of a brine tank; a plurality of heat abstracting coils distributed over the bottom of said tank; a duct defining a flow path along a portion only of said coils; and circulating means arranged to draw brine from said tank, and pass it through said duct.

2. In a refrigerating system, the combination of a brine tank; a plurality of heat abstracting coils distributed over the bottom of said tank; a duct defining a flow path along the middle portion of said coils; and circulating means arranged to draw brine from said tank, and pass it through said duct.

3. In a refrigerating system, the combination of a brine tank; a plurality of heat abstracting coils mounted in the bottom portion of said tank and arranged in groups, the coils of one group being more closely spaced than those of another; a duct defining a flow path along said more closely spaced group; and circulating means arranged to draw brine from said tank and pass it through said duct at a velocity rate materially higher than the velocity of flow of the brine in other portions of the tank.

4. The combination of a brine tank; heat abstracting coils mounted directly in said tank, and arranged in two differently located groups, one of which is constructed to abstract heat at a higher rate than the other; and brine circulating means serving to circulate the brine in the tank in contact with said groups at different velocity rates, the flow in contact with the group of higher heat abstraction rate having the higher velocity rate.

5. The combination of a brine tank; heat abstracting coils mounted in the lower portion of said tank; a duct housing a part of said coils and having an inlet from one end of the tank near the upper level of the brine therein, said duct terminating at a point adjacent the bottom of the tank near the other end thereof.

6. In a refrigerating system, the combination of a brine tank; a plurality of heat abstracting coils distributed over the bottom of said tank; a duct defining a flow path along the middle portion of said coils; circulating means arranged to draw brine from said tank, and pass it through said duct; and means for suspending tapered cans in said tank with their upper portions substantially in contact with each other on all sides of the cans.

7. In a refrigerating system, the combination of a brine tank; a plurality of heat abstracting coils mounted in the bottom portion of said tank and arranged in groups, the coils of one group being more closely spaced than those of another; a duct defining a flow path along said more closely spaced group; circulating means arranged to draw brine from said tank and pass it through said duct at a velocity rate materially higher than the velocity flow of the brine in other portions of the tank; and means for suspending tapered cans in said tank with their upper portions substantially in contact with each other on all sides of the cans.

8. In a refrigerating system, the combination of a brine tank; parallel cooling coils arranged in spaced groups in the bottom of said tank; a can supporting structure sustained on the bottom of said tank in the intervals between groups; a duct structure closing a coil group, and removable through the interval between the can supports; a plurality of juxtaposed removable can units, each including a plurality of cans and a supporting frame therefor, said frame being constructed and arranged to extend transversely between said supports; and a deck structure for said tank comprising juxtaposed removable sections carried by said can units.

9. In a refrigerating system, the combination of a brine tank; a plurality of heat abstracting coils distributed over the bottom of said tank; a duct defining a flow path along a portion only of said coils, said duct including a removable cover portion, which, when removed, gives access to the entire length of said coils; and circulating means arranged to draw brine from said tank and pass it through said duct.

10. In a refrigerating system, the combination of a brine tank; a plurality of heat abstracting coils arranged in the bottom of said tank in parallel groups; a duct defining a flow path along a portion of said coils and including a removable cover, which, when removed, gives access to the entire length of the enclosed coils; circulating means arranged to draw brine from said tank and pass it through said duct; a can supporting structure located over the intervals between coil groups, said supporting structure overlying no substantial portion of the coils; and a combined can and cover structure removably sustained by said supporting structure and when removed offering unobstructed access to the entire length of said coils and duct.

In testimony whereof I have signed my name to this specification.

THOMAS SHIPLEY.